(12) United States Patent
Ota et al.

(10) Patent No.: US 8,205,655 B2
(45) Date of Patent: Jun. 26, 2012

(54) VIBRATION WELDING APPARATUS

(75) Inventors: Hirofumi Ota, Yokohama (JP); Isamu Yoneda, Kawasaki (JP); Shoko Ina, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/017,974

(22) Filed: Jan. 31, 2011

(65) Prior Publication Data

US 2011/0186238 A1    Aug. 4, 2011

(30) Foreign Application Priority Data

Feb. 2, 2010    (JP) ................................. 2010-021161

(51) Int. Cl.
*B32B 37/00*    (2006.01)
(52) U.S. Cl. ...................... 156/580; 156/73.5
(58) Field of Classification Search .............. 156/73.5, 156/580, 580.1, 580.2; 264/68; 228/112.1, 228/2.1
See application file for complete search history.

(56) References Cited

U.S. PATENT DOCUMENTS

| | | | | |
|---|---|---|---|---|
| 6,033,505 A | * | 3/2000 | Sugiyama et al. | 156/73.5 |
| 7,036,293 B2 | * | 5/2006 | Kammler et al. | 53/551 |
| 7,854,246 B2 | * | 12/2010 | Tesch | 156/580 |

FOREIGN PATENT DOCUMENTS

JP    10-296460 A    11/1998
* cited by examiner

*Primary Examiner* — James Sells
(74) *Attorney, Agent, or Firm* — Canon USA Inc IP Division

(57) ABSTRACT

A vibration welding apparatus vibrates a vibration-side processing member when the vibration-side processing member comes into pressure-contact with a fixing-side processing member, and the vibration-side processing member and the fixing-side processing member are welded. The vibration welding apparatus includes a first clamp unit for clamping the processing member on the vibration side, a second clamp unit for clamping the processing member on the fixing side, a vibration unit for vibrating the first clamp unit, and a release unit for releasing a state in which the first clamp unit clamps the vibration-side processing member. The first clamp unit moves a pressing member with elastic force of an elastic member, and presses the vibration-side processing member to clamp the vibration side processing member, and the release unit is disposed independently of the first clamp unit, and separates the vibration-side processing member pressed under the elastic force of the elastic member.

4 Claims, 5 Drawing Sheets

VIBRATION WELDING APPARATUS

BACKGROUND OF THE INVENTION

1. Field of the Invention

The present invention relates to a vibration welding apparatus with which the vibration-side processing member containing a thermoplastic material and the fixing-side processing member are welded by vibrating the vibration-side processing member in a state in which the processing member on the fixing side is pressed to the vibration-side processing member.

2. Description of the Related Art

The present invention relates to a vibration welding apparatus with which the vibration-side processing member containing a thermoplastic material and the fixing-side processing member are welded by vibrating the vibration-side processing member in a state in which the fixing-side processing member is pressed to the vibration-side processing member.

Conventionally, the type of vibration welding apparatus includes: an upper jig having vibration units of an electromagnetic driving system that clamps the vibration-side processing member and vibration transmission units such as a plate spring; and a lower jig having a pressing device that clamps a processing member on the fixing side. The vibration welding apparatus welds both the vibration-side processing member and the fixing-side processing member by making the vibration-side processing member adhere to the fixing-side processing member and vibrating the vibration-side processing member.

As the vibration welding apparatus, Japanese Patent Application Laid-Open No. 10-296460 discusses a vibration welding apparatus in which an upper jig includes a cushion portion as an elastic body, the cushion portion is pressed to the vibration-side processing member, and the vibration-side processing member is thus clamped. An abutting surface of the cushion portion that abuts on the vibration-side processing member of the upper jig and an abutting surface that abuts on the vibration-side processing member of a lower jig are rough surface. As a consequence, the positional deviation between the upper jig and lower jig and the abutting surface of the vibration-side processing member due to the vibration is suppressed, and a flaw on the surface of the vibration-side processing member due to vibration transmission loss is prevented.

However, the conventional vibration welding apparatus clamps the vibration-side processing member with frictional force on the rough surface. Therefore, long-term use deteriorates the frictional force on the surface of the upper jig, and clamping force of the upper jig is reduced. It becomes thus difficult to reduce the damage on the surface of the vibration-side processing member.

SUMMARY OF THE INVENTION

The present invention is directed to provide a vibration welding apparatus in which a flaw on the surface of a vibration-side processing member is prevented by reducing the vibration transmission loss.

According to an aspect of the present invention, a vibration welding apparatus vibrates a vibration-side processing member in a state in which the vibration-side processing member comes into contact with a processing member on a fixing side under pressure, and the vibration-side processing member and the fixing-side processing member are welded. The vibration welding apparatus includes first clamp unit configured to clamp the vibration-side processing member, second clamp unit configured to clamp the fixing-side processing member, vibration means configured to vibrate the first clamp unit, and release unit configured to release a state in which the first clamp unit clamps the vibration-side processing member. The first clamp unit moves a pressing member with elastic force of an elastic member, and presses the vibration-side processing member to clamp the vibration side processing member, and the release unit is disposed independently of the first clamp unit, and separates the processing member on the vibration side pressed under the elastic force of the elastic member from the first clamp unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
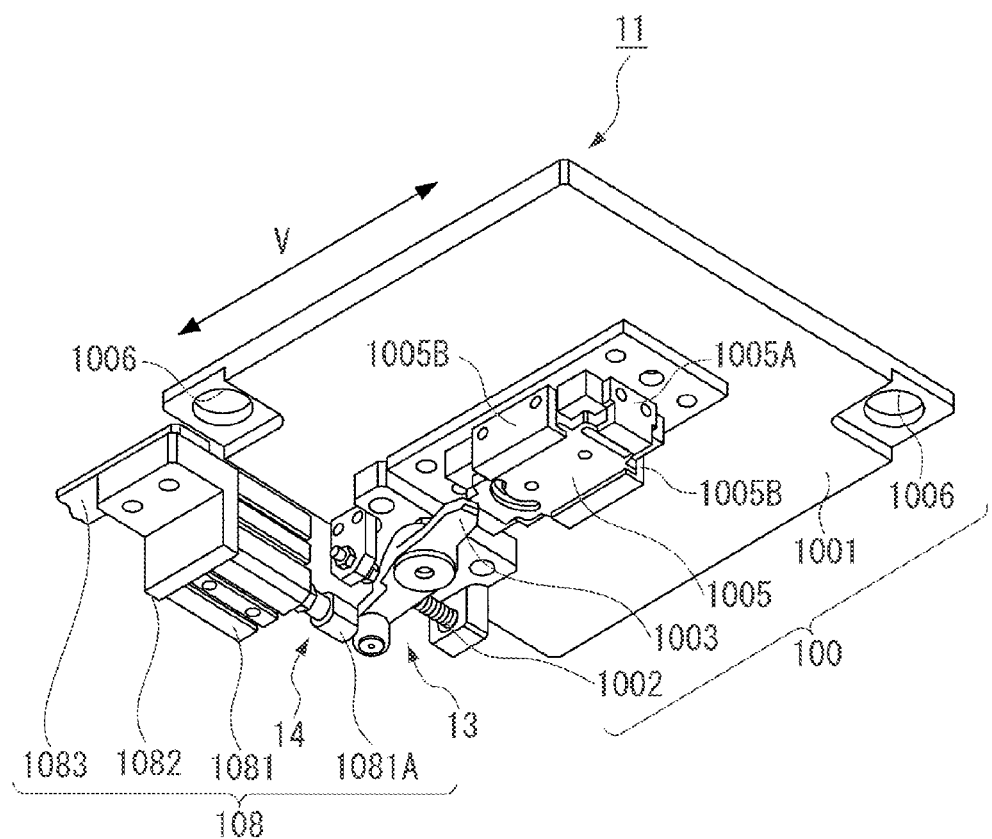
FIG. 1 illustrates a perspective view of a vibration-side unit in a vibration welding apparatus from the underside according to an exemplary embodiment of the present invention.
Figure 2:
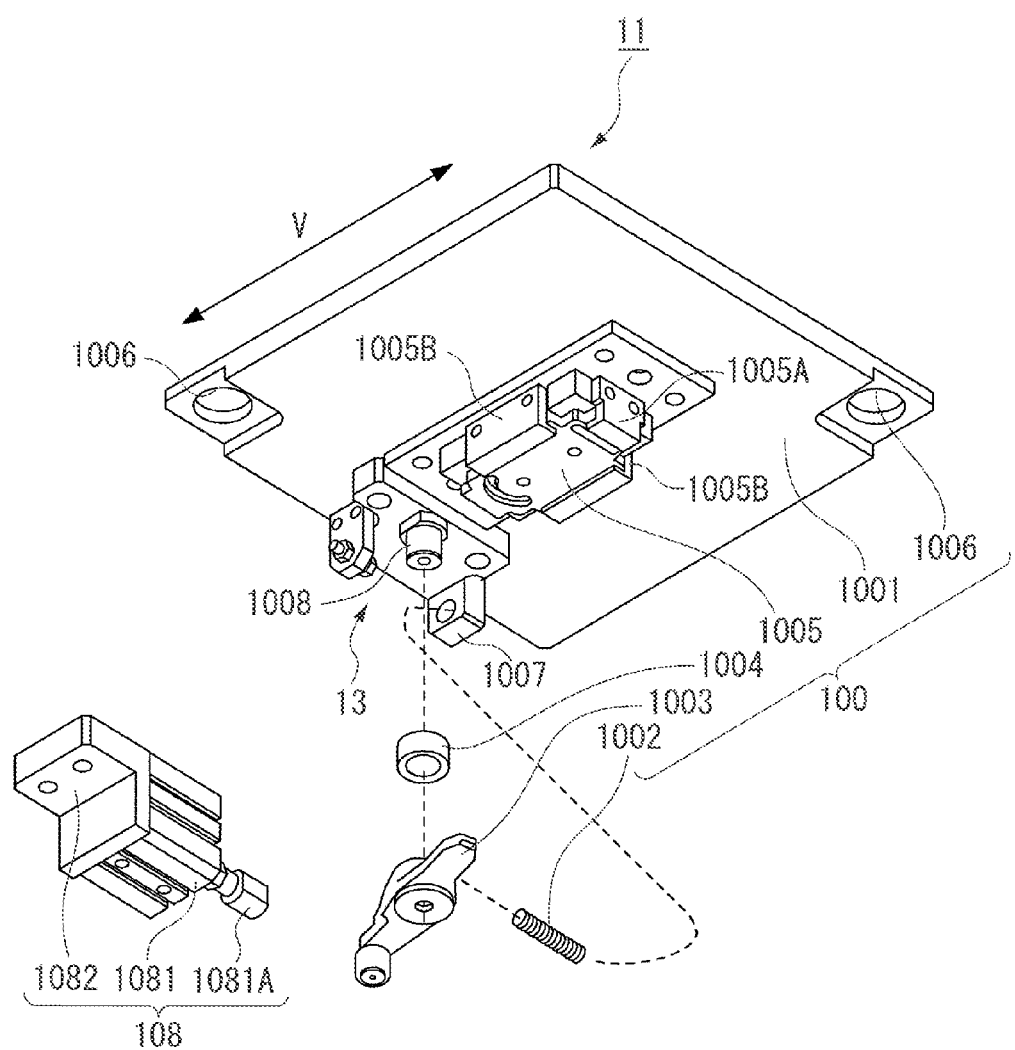
FIG. 2 illustrates an exploded perspective view of FIG. 1.
Figure 3A:
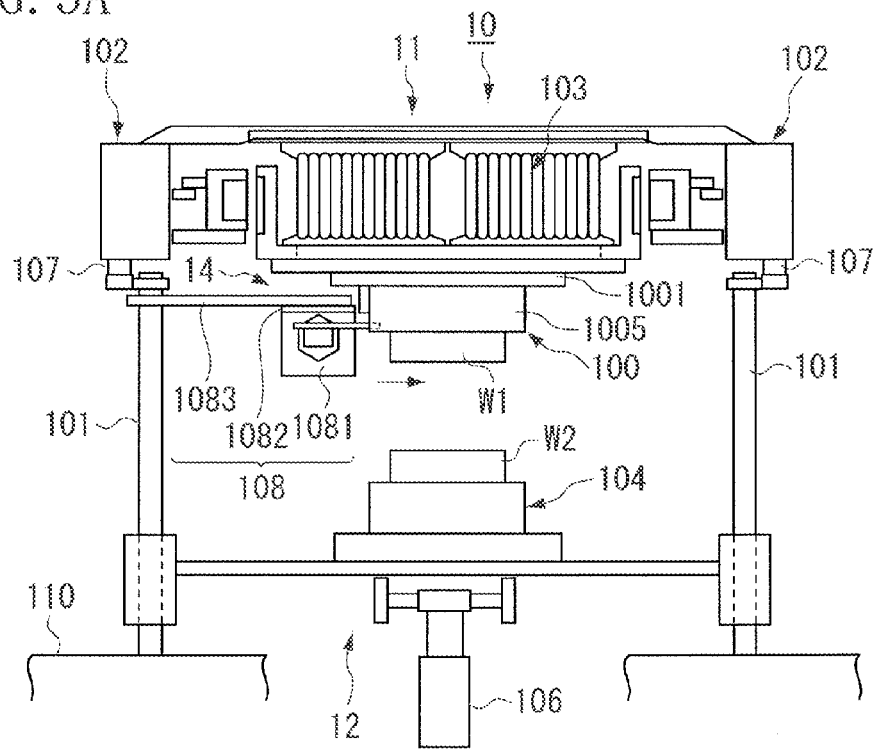
FIGS. 3A and 3B illustrate front views of a vibration welding apparatus according to the exemplary embodiment of the present invention.
Figure 3B:
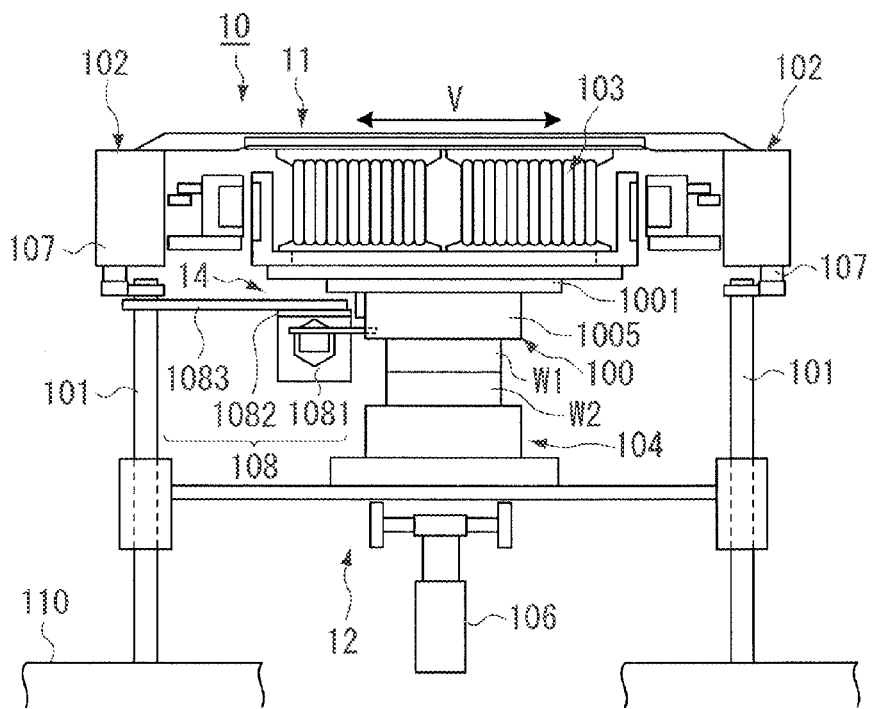
Figure 4A:
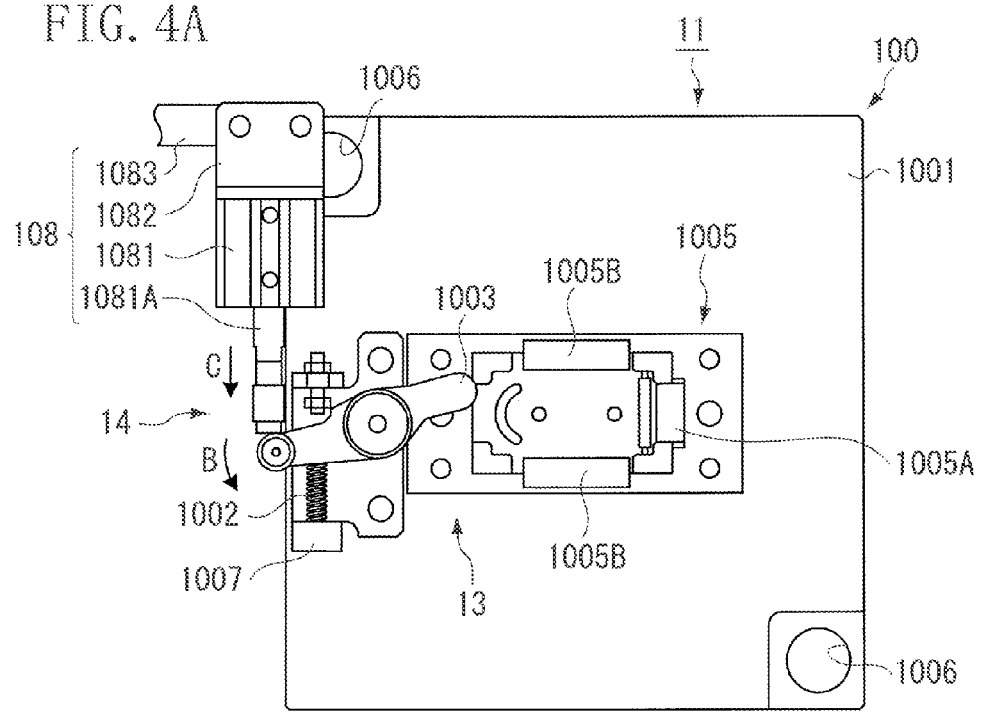
FIGS. 4A and 4B illustrate bottom views of the vibration-side unit in the vibration welding apparatus according to the exemplary embodiment of the present invention.
Figure 4B:
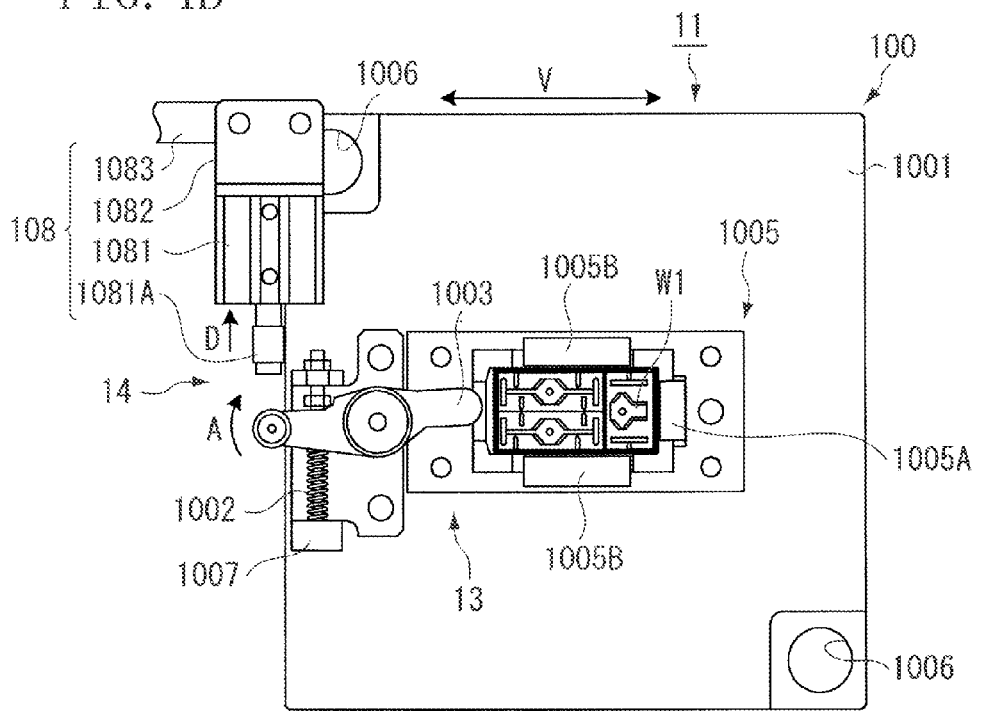

FIG. 1 illustrates a perspective view of a vibration-side unit in a vibration welding apparatus 10 from the underside according to a first exemplary embodiment of the present invention. FIG. 2 illustrates an exploded perspective view of FIG. 1. FIGS. 3A and 3B illustrate front views of the vibration welding apparatus 10 according to the exemplary embodiment of the present invention. FIG. 3A illustrates the vibration welding apparatus 10 in a stationary state, and FIG. 3B illustrates the vibration welding apparatus 10 in a welding operation state. FIGS. 4A and 4B illustrate diagrams of the vibration-side unit in the vibration welding apparatus 10 in FIGS. 3A and 3B from the underside. FIG. 4A illustrates a vibration jig unit releasing a clamp of the vibration-side processing member, and FIG. 4B illustrates the vibration jig unit clamping the vibration-side processing member.

First, the configuration of the vibration welding apparatus 10 is described.

The vibration welding apparatus 10 includes a vibration-side unit 11 and a fixing-side unit 12.

The vibration-side unit 11 clamps a vibration-side processing member W1, and vibrates the vibration-side processing member W1.

The vibration-side unit 11 includes a vibration generation unit 102, a vibration transmission unit 103, a vibration jig unit 100, and a clamp releasing unit 108.

The vibration generation unit 102, the vibration transmission unit 103, and the vibration jig unit 100 are arranged onto a support rod 101 disposed on a pedestal 110 of the vibration welding apparatus 10 via a vibration-proof rubber 107. The clamp releasing unit 108 is fixed to the support rod 101.

The vibration-proof rubber 107 sets the vibration generated by the vibration-side unit 11 to be transmitted only to the surface of the vibration side processing member, thereby preventing the resonance of the vibration-side unit 11 and the fixing-side unit 12. Thus, the vibration-proof rubber 107 causes the vibration welding apparatus 10 to perform better welding operation. Therefore, a spring may be used as an alternative for the vibration-proof rubber 107.

The vibration generation unit 102 generates vibrations with an operation of electromagnet (not illustrated). The vibration transmission unit 103 transmits the vibrations generated by the vibration generation unit 102 to the vibration jig unit 100 attached to the lower surface via a plate spring or the like.

The vibration jig unit 100 as a first clamp unit includes a base 1001 and a processing-member fixing block 1005. The base 1001 is fixed to the lower surface of the vibration transmission unit 103 with a bolt piercing through an attachment hole 1006. The processing-member fixing block 1005 for fixing the processing member W1 on the vibration side is fixed to the lower surface of the base 1001 with a bolt.

As illustrated in FIG. 1, the processing-member fixing block 1005 includes an end piece 1005A and a pair of side pieces 1005B that are U-shaped arranged to receive the vibration side processing member W1. The processing-member fixing block 1005 includes a clamp lever 1003 that is rotated by the clamp releasing unit 108 and presses the vibration-side processing member W1 to the vibration direction (in the direction of an arrow V), a shaft 1008 that rotates and supports the clamp lever 1003, and a bush 1004. Further, a spring 1002 as an elastic member for applying rotation force to the clamp lever 1003 in the direction of an arrow A in FIG. 4B is arranged between a projected piece 1007 of the processing-member fixing block 1005 and the clamp lever 1003 when vibrating and welding the processing members W1 and W2.

As illustrated in FIGS. 3A and 3B, the clamp releasing unit 108 as releasing unit is fixed to the support rod 101 with a bracket 1083. As illustrated in FIG. 1, a stay 1082 for releasing the clamp is attached to the bracket 1083. The plunger 1081 is attached to the stay 1082 for releasing the clamp. Referring to FIG. 4A, the plunger 1081 releases the clamp of the vibration-side processing member W1 by rotating the clamp lever 1003 in the direction of an arrow B.

The clamp lever 1003, the processing-member fixing block 1005, and the spring 1002 configure a clamp mechanism 13 for clamping the vibration side processing member W1 to the vibration jig unit 100. The clamp mechanism 13 and the plunger 1081 configure a clamp device 14.

With regard to the configuration described above, the vibration jig unit 100 and the clamp releasing unit 108 are basically made of SUS in consideration of workability, rigidity, and corrosion protection in use. As for the spring 1002, the bush 1004, and the plunger 1081, marketed products are used. Each material is not limited to SUS, but required to be resistant to impact to the parts in the vibration direction of the vibration welding apparatus 10.

The fixing-side unit 12 is arranged under the vibration-side unit 11. The fixing-side unit 12 includes a fixing jig unit 104 as second clamp unit and a pressing device 106. The fixing jig unit 104 is arranged to the support rod 101 to be freely ascended and descended, thereby clamping the fixing-side processing member W2. The pressing device 106 is disposed on the pedestal 110 and raises the fixing jig unit 104 with an air cylinder or the like, and the fixing-side processing member W2 clamped by the fixing jig unit 104 is pressed in contact with the vibration-side processing member W1 clamped by the vibration jig unit 100. The fixing jig unit 104 includes a mechanism that clamps the fixing-side processing member W2 to reduce the loss of welding energy during the vibration and welding.

A description is given of an vibration and welding operation of the vibration welding apparatus 10.

First, basic operation processing is described. As illustrated in FIG. 3A, a user causes the vibration jig unit 100 and the fixing jig unit 104 to clamp the vibration-side processing member W1 and the fixing-side processing member W2 respectively. The vibration-side processing member W1 and the fixing-side processing member W2 are thermoplastic materials.

A start button of the vibration welding apparatus 10 is pressed. Then, the fixing jig unit 104 rises and the fixing-side processing member W2 comes into contact with the vibration-side processing member W1. In a state in FIG. 3B, pressing force between the processing members W1 and W2 is detected by a pressure detection mechanism or a position detection mechanism (not illustrated) disposed on the fixing-side unit 12. When the detected pressing force reaches a setting value (at trigger point), the vibration jig unit 100 starts to vibrate in the direction of the arrow V. After starting the vibration, with the vibration of the vibration jig unit 100, friction heat is generated on the contact surface between the vibration-side processing member W1 and the fixing-side processing member W2, and the processing members W1 and W2 start to fuse. Then, after predetermined time or a predetermined amount of fusion, the vibration of the vibration jig unit 100 stops and the welded vibration-side processing member W1 and fixing-side processing member W2 are cooled.

Finally, the vibration jig unit 100 releases the vibration-side processing member W1, and the fixing jig unit 104 clamps the vibration-side processing member W1 and fixing-side processing member W2 that are welded, and returns to the position in FIG. 3A.

Specific operation processing is described.

FIGS. 4A and 4B illustrate the operation state of the clamp releasing unit 108 depending on the presence or absence of the processing member W1 on the vibration side at the vibration and welding time. FIG. 4A illustrates a state where the vibration side processing member W1 can be attached to the vibration jig unit 100 in preparing the vibration and welding operation of the vibration welding apparatus 10, corresponding to the state in FIG. 3A.

In this state, a piston 1081A of the plunger 1081 is projected in the direction of an arrow C. Therefore, the plunger 1081 compresses the spring 1002, rotates the clamp lever 1003 in the direction of an arrow B (counterclockwise direction), and generates clearance in the vibration direction (of the arrow V) between the vibration-side processing member W1 and the clamp lever 1003. The clearance is a gap for attaching the vibration side processing member W1 to the processing-member fixing block 1005.

FIG. 4B illustrates a state where preparation for the vibration and welding operation of the vibration welding apparatus 10 is completed, and the vibration-side processing member W1 is attached to the vibration jig unit 100, and the processing members W1 and W2 are capable of starting the vibration and welding or during the vibration and welding, corresponding to FIG. 3B.

In this state, the piston 1081A in the plunger 1081 is retracted in the direction of an arrow D. Therefore, the spring 1002 is expanded, the clamp lever 1003 is rotated in the direction of an arrow A (clockwise direction), the end surface of the vibration-side processing member W1 is pressed to the vibration direction, and the vibration-side processing member W1 is pressed to the end piece 1005A of the processing-member fixing block 1005. Simultaneously, the vibration-side processing member W1 is restricted in the direction perpendicular to the vibration direction with the pair of side pieces 1005B. Specifically, the vibration-side processing member W1 is restricted in motion in the horizontal direction with the processing-member fixing block 1005 to be integrated with the vibration jig unit 100. Therefore, the vibration-side processing member W1 is certainly vibrated integrally with the vibration jig unit 100, and the loss of welding energy is thus small at the vibration and welding time. The state continues from the start to the end of the vibration and welding.

The clamp lever 1003 is rotated in the direction of the arrow A (clockwise direction) and, the clamp lever 1003 clamps the vibration side processing member W1 to the processing-member fixing block 1005 at the falling timing of the fixing jig unit 104 as illustrated in FIG. 3A. However, the processing member W1 on the vibration side may be clamped to the processing-member fixing block 1005 at the timing just before rising the fixing jig unit 104 to the position illustrated in FIG. 3B and then starting the vibration and welding.

Actually, during the time from attaching the vibration side processing member W1 to the vibration jig unit 100, to starting the vibration and welding, the fall of the vibration side processing member W1 from the vibration jig unit 100 needs to be considered. Therefore, the vibration side processing member W1 is supplied to the upper portion of the processing member W2 on the fixing side. Just before rising the fixing jig unit 104 that clamps the fixing side processing member W2 and starting the vibration and welding, the clamp lever 1003 clamps the processing member W1 on the vibration side to the processing-member fixing block 1005.

The fixing jig unit 104 ascends by pressing operation of the pressing device 106 and guiding of the support rod 101, thereby bringing the fixing side processing member W2 into contact with the vibration side processing member W1. Thereafter, the vibration generation unit 102 is operated, and the vibration side processing member W1 contacting the fixing side processing member W2 under pressure is vibrated in the direction of the arrow V in FIGS. 3B and 4B. As a consequence, heat is generated on the contact surface between the vibration-side processing member W1 and the fixing-side processing member W2, and the processing members W1 and W2 are welded and integrated to each other.

Thereafter, the plunger 1081 is operated. The plunger 1081 rotates the clamp lever 1003 with the piston 1081A in the direction of an arrow B in FIG. 4A, thereby releasing the vibration-side processing member W1 that is clamped all this time.

Thereafter, the pressing device 106 descends lowers the fixing jig unit 104. The fixing jig unit 104 descends while clamping the fixing side processing member W2 to which the vibration-side processing member W1 is welded with the vibration and welding.

Thus, a series of vibration and welding operation with the vibration welding apparatus 10 ends.

In the above description, according to the first exemplary embodiment, as an example, to easily understand the configuration, numeric value of each unit is shown. The numeric value is reference and does not limit the present invention.

First, as the basic specification of the vibration welding apparatus 10, vibration thrust is 1000N, amplitude is 1 mm, and a vibration frequency is 240 Hz. A friction coefficient of both the processing members W1 and W2 is 0.3. Therefore, the rigidity required for the parts may be 1000N in the rising direction and 300N in the horizontal direction.

As the specifications of the clamp lever 1003 and the spring 1002, clamping force larger than the above described force 300N in the horizontal direction is required. Therefore, the distance from the rotational center of the clamp lever 1003 to the contact surface with the vibration-side processing member W1 is 40 mm, and the distance from the rotational center to a spring setting portion is 25 mm, and the spring load of the spring 1002 is 98N.

In the calculation, variation width of the outer size of the vibration-side processing member W1 is set to 0.6 mm, and the angular variation at the clamping time ranges 1 to 11 degrees. The distance from the rotational center of the clamp lever 1003 to a contact portion with the plunger 1081 is 30 mm. While the longer the distance, the weaker the force which clamps the spring, it must be taken in consideration that the stroke becomes longer as the distance becomes longer.

Next, as the specification of the plunger 1081, the thrust is 82N or more because of the specification of the clamp lever 1003. The contact state with the clamp lever 1003 during the vibration and welding needs to be prevented, and the piston 1081A is disposed at a right angle to the vibration direction as illustrated in FIGS. 4A and 4B because the stroke of the piston 1081A needs to be more than 8.7 mm, in which a stroke amount 5.8 mm corresponding to variation amount width of the outer size of the vibration-side processing member, and a stroke amount 2.9 mm corresponding to clearance 0.3 mm required to attach the vibration-side processing member are added. According to the present exemplary embodiment, a cylinder with a stroke amount 10 mm is selected in consideration of the assembly precision and processing precision of parts in addition to the above described values.

In the vibration welding apparatus 10 according to the exemplary embodiment, the surface for pressing the processing member W1 on the vibration side by the clamp releasing unit 108 is only one surface vertical to the vibration direction because the total weight of the vibration jig unit 100 needs to be small as much as possible. Alternatively, both the surfaces in the vibration direction may be pressed.

Figure 5A:
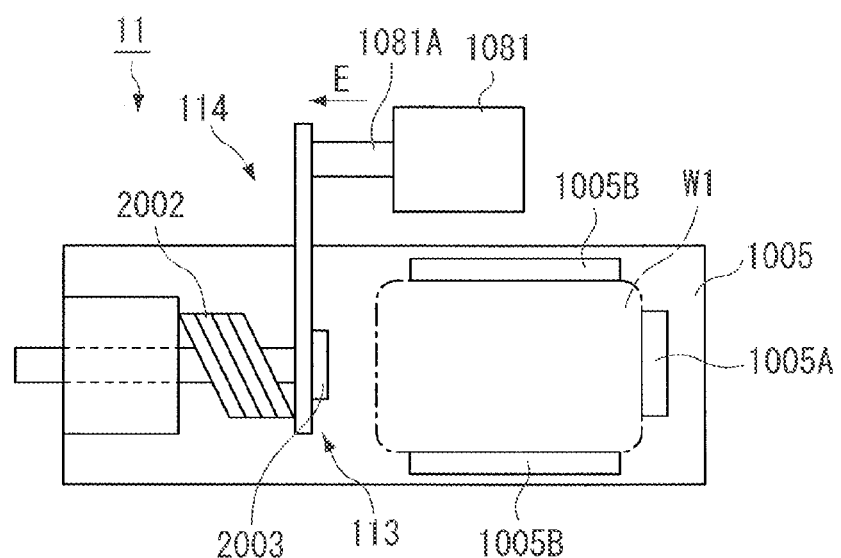
FIGS. 5A and 5B illustrate schematic diagrams of operation according to another exemplary embodiment of the present invention.
Figure 5B:
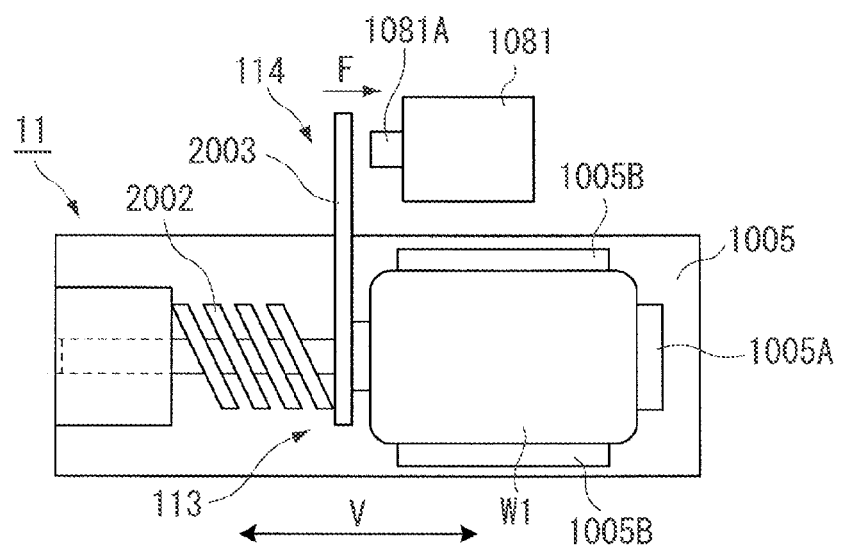

The second exemplary embodiment is next described. In the vibration welding apparatus 10, with the rotating clamp lever 1003, the vibration-side processing member W1 is clamped. As illustrated in FIGS. 5A and 5B, with the movable lever 2003 that moves linearly, the vibration-side processing member W1 may be clamped.

FIG. 5A illustrates a preparing state for the vibration and welding. FIG. 5B illustrates a state where preparation for the vibration and welding is completed. A spring 2002, the movable lever 2003, and the plunger 1081 are arranged so that all the operation directions thereof are similar to the vibration direction (direction of the arrow V). It is assumed that the spring 2002 and the movable lever 2003 are disposed on the vibration jig unit 100 in FIG. 1 and the plunger 1081 is arranged on the support rod 101.

In FIG. 5A, the piston 1081A of the plunger 1081 is projected in the direction of an arrow E, and the movable lever 2003 is apart from the processing-member fixing block 1005 resisting the spring 2002, and the vibration welding apparatus 10 is preparing for the vibration and welding. In this state, the vibration-side processing member W1 is attached to the processing-member fixing block 1005.

In FIG. 5B, the piston 1081A in the plunger 1081 is retracted in the direction of an arrow F. Therefore, the movable lever 2003 is pressed by the spring 2002, thereby pressing the processing member W1 on the vibration side to the end piece 1005A of the processing-member fixing block 1005, so that the vibration welding apparatus 10 is prepared for the vibration and welding. In this state, the fixing-side processing member W2 is vibrated and welded to the vibration-side processing member W1.

With the above-described configuration, the movable lever 2003, the processing-member fixing block 1005, and the spring 2002 form a clamp mechanism 113 that clamps the vibration-side processing member W1 to the vibration jig unit 100. The clamp mechanism 113 and the plunger 1081 form the clamp device 114.

The vibration welding apparatus 10 includes the clamp mechanism 13 (or 113) as clamp means that clamps the vibration-side processing member W1 and the fixing-side unit 12 as pressing means that presses and clamps the fixing-side processing member W2 and presses the fixing-side processing member W2 to the vibration-side processing member W1. Further, the vibration welding apparatus 10 includes a vibration generation unit 102 as a vibration unit that vibrates the clamp mechanism 13 (or 113), and the plunger 1081 as a release unit that releases a state in which the clamp mechanism 13 (or 113) clamps the vibration-side processing member W1. The clamp mechanism 13 (or 113) includes the spring 1002 (or 2002) as an elastic member, and the clamp lever 1003 (or the movable lever 2003) as a pressing member that presses the vibration-side processing member W1 with a spring. Further, the clamp mechanism 13 (or 113) includes the processing-member fixing block 1005 as a reception member that receives the vibration-side processing member W1 pressed to the clamp lever 1003 (or the movable lever 2003). The plunger 1081 is usually apart from the clamp lever 1003 (or the movable lever 2003). When the vibration-side processing member W1 is released from the clamp mechanism 13 (or 113), the plunger 1081 works on the clamp lever 1003 (or the movable lever 2003). The plunger 1081 separates the clamp lever 1003 (or the movable lever 2003) from the vibration-side processing member W1 resisting the spring 1002 (or 2002).

Therefore, the vibration welding apparatus 10 presses and clamps the vibration-side processing member W1 to the processing-member fixing block 1005 with the clamp lever 1003 (or the movable lever 2003), thereby reducing the energy loss when transmitting the vibration. The occurrence of a flaw to the vibration-side processing member W1 can be reduced.

In the vibration welding apparatus 10 according to the present invention, the plunger 1081 is generally separated from the clamp lever 1003 (or the movable lever 2003). Therefore, when applying the vibration to the vibration-side processing member W1, the vibration does not cause the plunger to release the vibration-side processing member W1.

The clamp mechanism 13 (or 113) and the vibration generation unit 102 in the vibration welding apparatus 10 according to the present invention are supported on the support rod 101 as a fixing member via the vibration-proof rubber 107 as a vibration-proof member.

Therefore, the vibration welding apparatus 10 prevents the resonance between the vibration generation unit 102 and the fixing-side unit 12 and accurately performs the vibration and welding without transmitting the vibration of the vibration generation unit 102 to the fixing-side unit 12.

In the vibration welding apparatus 10 according to the present invention, the direction for pressing the processing member W1 on the vibration side to the receiving member by the clamp lever 1003 (or the movable lever 2003) is the same as the vibration direction of the clamp mechanism 13 (or 113).

Therefore, the vibration welding apparatus 10 certainly clamps the vibration-side processing member W1, thereby vibrating and welding the vibration-side processing member W1 and the processing member on the fixing side W2 without fails.

In the vibration welding apparatus 10 according to the present invention, the clamp lever 1003 is rotatable in the direction for pressing the vibration-side processing member W1 with the spring 1002.

Thus, in the vibration welding apparatus 10, the operation force of the plunger 1081 is increased with the rotating clamp lever 1003. The clamp lever 1003 and the processing-member fixing block 1005 certainly clamp the processing member W1 on the vibration side.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-021161 filed Feb. 2, 2010, which is hereby incorporated by reference herein in its entirety.

What is claimed is:

1. A vibration welding apparatus that vibrates a vibration-side processing member in a state in which the vibration-side processing member comes into contact with a fixing-side processing member under pressure, and the vibration-side processing member and the fixing-side processing member are welded, the vibration welding apparatus comprising:
a first clamp unit configured to clamp the vibration-side processing member;
a second clamp unit configured to clamp the fixing-side processing member;
a vibration unit configured to vibrate the first clamp unit; and
a release unit configured to release a state in which the first clamp unit clamps the processing member on the vibration side,
wherein the first clamp unit moves a pressing member with elastic force of an elastic member, and presses the processing member on the vibration side to clamp the vibration-side processing member, and
the release unit is disposed independently of the first clamp unit, and separates the processing member on the vibration side pressed with the elastic force of the elastic member from the first clamp unit.

2. The vibration welding apparatus according to claim 1, wherein the first clamp unit and the vibration unit are supported on a fixing member via a vibration-proof member.

3. The vibration welding apparatus according to claim 1, wherein a direction for pressing the vibration-side processing member by the pressing member is similar to the vibration direction of the clamp unit.

4. The vibration welding apparatus according to claim 1, wherein the pressing member is a clamp lever that is rotatable under the elastic force of the elastic member.

* * * * *